(12) United States Patent (10) Patent No.: US 12,679,434 B2
Zhang (45) Date of Patent: Jul. 14, 2026

(54) DOUBLE-DECKER WAGON

(71) Applicant: Jinhua Mutao Leisure Products Co., Ltd., Jinhua (CN)

(72) Inventor: Xiangshan Zhang, Suzhou (CN)

(73) Assignee: Jinhua Mutao Leisure Products Co., Ltd., Jinhua (CN)

( * ) Notice: Subject to any disclaimer, the term of this patent is extended or adjusted under 35 U.S.C. 154(b) by 253 days.

(21) Appl. No.: 18/736,545

(22) Filed: Jun. 7, 2024

(65) Prior Publication Data

US 2025/0326417 A1 Oct. 23, 2025

(30) Foreign Application Priority Data

Apr. 23, 2024 (CN) .......................... 202420850740.3

(51) Int. Cl.
B62B 3/00 (2006.01)
B62B 3/02 (2006.01)
B62B 5/06 (2006.01)

(52) U.S. Cl.
CPC .............. B62B 3/007 (2013.01); B62B 3/025 (2013.01); B62B 5/065 (2013.01); *B62B 2205/06* (2013.01)

(58) Field of Classification Search
CPC ..... B62B 2205/06; B62B 3/007; B62B 3/022; B62B 3/025; B62B 5/067; B62B 2205/02; B62B 2205/33; B62B 2301/25; B62B 3/002; B62B 5/065
USPC ....................................................... 280/47.34
See application file for complete search history.

(56) References Cited

U.S. PATENT DOCUMENTS

| | | | | |
|---|---|---|---|---|
| 8,388,015 B2* | 3/2013 | Chen | ......................... | B62B 3/02 |
| | | | | 280/642 |
| 10,099,711 B1* | 10/2018 | Sun | ......................... | B62B 3/007 |
| 11,332,178 B2* | 5/2022 | Yang | ....................... | B62B 5/067 |
| 11,685,416 B2* | 6/2023 | Yang | ....................... | B62B 3/025 |
| | | | | 280/651 |
| 12,304,544 B2* | 5/2025 | Conn | ...................... | B62B 5/067 |
| 12,491,922 B1* | 12/2025 | Qiao | ....................... | B62B 3/007 |
| 2010/0156069 A1* | 6/2010 | Chen | ....................... | B62B 9/142 |
| | | | | 280/639 |
| 2016/0082997 A1* | 3/2016 | Horowitz | ................. | B62B 5/06 |
| | | | | 280/651 |

(Continued)

FOREIGN PATENT DOCUMENTS

CN 220743070 U 4/2024

*Primary Examiner* — James A Shriver, II
*Assistant Examiner* — Hilary L Johns
(74) *Attorney, Agent, or Firm* — Bayramoglu Law Offices LLC

(57) ABSTRACT

A double-decker wagon is provided. The double-decker wagon includes four spaced rectangular standing posts, four side folding mechanisms each sequentially hinged between two adjacent standing posts, an upper bottom support mechanism, and a lower bottom support mechanism, where the standing posts each are provided with a first fixing member, a second fixing member, and a third fixing member in sequence from top to bottom; a sliding sleeve is provided in a sliding manner between the fixing member and the second fixing member; the side folding mechanism is hinged to the sliding sleeve and the first fixing member on the standing post; the upper bottom support mechanism is hinged to the second fixing members on the four standing posts; and the lower bottom support mechanism is hinged to the third fixing members on the four standing posts.

11 Claims, 8 Drawing Sheets

(56)     References Cited

U.S. PATENT DOCUMENTS

2021/0300449 A1*   9/2021   Yang ...................... B62B 3/025
2021/0300450 A1*   9/2021   Yang ...................... B62B 3/025
2024/0124040 A1*   4/2024   Conn ...................... B62B 5/067

* cited by examiner

DOUBLE-DECKER WAGON

CROSS-REFERENCE TO THE RELATED APPLICATIONS

This application is based upon and claims priority to Chinese Patent Application No. 202420850740.3, filed on Apr. 23, 2024, the entire contents of which are incorporated herein by reference.

TECHNICAL FIELD

The present disclosure relates to the technical field of collapsible wagons, and in particular to a double-decker wagon.

BACKGROUND

In daily life and production, it is often necessary to use wagons to transport luggage or items. Wagons are widely used because they are convenient, time-saving and effortless to push. Collapsible wagons are designed for easy storage. Collapsible wagons are lightweight and can be placed in the vehicle after folding, making them easy to carry. However, existing collapsible wagons are single-decker wagons with small capacity and large folded volume. In addition, when a single-decker wagon is used to carry items, it is not convenient for users to pick up the items that are stacked together on the single-decker wagon.

SUMMARY

(I) Technical Problem to be Solved

In view of the above-mentioned shortcomings in the prior art, the present disclosure provides a double-decker wagon, which solves the technical problems of small capacity, large folded volume, and inability to allow users to pick and place items by class.

(II) Technical Solution

In order to achieve the objective, the double-decker wagon of the present disclosure includes:

four spaced rectangular standing posts, four side folding mechanisms each sequentially hinged between two adjacent standing posts, an upper bottom support mechanism, and a lower bottom support mechanism, where the standing posts each are fixedly provided with a first fixing member, a second fixing member, and a third fixing member in sequence from top to bottom; and a sliding sleeve is provided in a sliding manner on the standing post between the first fixing member and the second fixing member;

the side folding mechanism is hinged to the sliding sleeve and the first fixing member on the standing post;

the upper bottom support mechanism is hinged to the second fixing members on the four standing posts;

the lower bottom support mechanism is hinged to the third fixing members on the four standing posts; and the side folding mechanisms, the upper bottom support mechanism, and the lower bottom support mechanism are collapsible.

Optionally, the upper bottom support mechanism includes at least a first crossing member and a second crossing member that are sequentially hinged; and the first crossing member is hinged to the second fixing members on two standing posts, and the second crossing member is hinged to the second fixing members on the other two standing posts.

Optionally, the first crossing member and the second crossing member each include a first connector, as well as a first connecting tube, a second connecting tube, a third connecting tube, and a fourth connecting tube that are rotationally connected to the first connector at a limited angle;

the first connecting tube and the second connecting tube of the first crossing member are respectively rotationally connected to the second fixing members on the two standing posts at a limited angle; the first connecting tube and the second connecting tube of the second crossing member are respectively rotationally connected to the second fixing members on the other two standing posts at a limited angle; and the third connecting tube and the fourth connecting tube of the first crossing member are respectively rotationally connected to the third connecting tube and the fourth connecting tube of the second crossing member at a limited angle.

Optionally, the double-decker wagon further includes a pair of connecting mechanisms that are respectively located at front and rear sides;

the connecting mechanisms each include a suspension rod, a sliding member, and a limiting member;

the sliding member is provided on the suspension rod in a sliding manner; the limiting member is provided at a first end of the suspension rod; and a second end of the suspension rod is hinged to the side folding mechanism at a same side; and the third connecting tubes of the first crossing member and the second crossing member are rotationally connected to an adjacent sliding member at a limited angle, while the fourth connecting tubes of the first crossing member and the second crossing member are rotationally connected to an adjacent sliding member at a limited angle.

Optionally, the lower bottom support mechanism includes a second connector and four fifth connecting tubes that are rotationally connected to the second connector at a limited angle; and the four fifth connecting tubes are respectively rotationally connected to the third fixing members on the four standing posts at a limited angle.

Optionally, the double-decker wagon further includes a rear frame mechanism; and one end of the rear frame mechanism is rotationally connected to lower ends of two adjacent standing posts at a limited angle.

Optionally, the rear frame mechanism includes a first rear frame standing post, a second rear frame standing post, and a rear frame folding assembly; and the rear frame folding assembly is connected between the first rear frame standing post and the second rear frame standing post; and first ends of the first rear frame standing post and the second rear frame standing post are respectively rotationally connected to the lower ends of the two adjacent standing posts at a limited angle.

Optionally, the first rear frame standing post and the second rear frame standing post each are provided with a fold-down sliding sleeve in a sliding manner; and the rear frame folding assembly includes a first crossing bent tube, a second crossing bent tube, a first crossing straight tube, and a second crossing straight tube;

the first crossing bent tube and the second crossing bent tube are rotationally connected; a first end of the first crossing bent tube is rotationally connected to the first rear frame standing post; and a first end of the second crossing bent tube is rotationally connected to the fold-down sliding sleeve on the first rear frame standing post;

the first crossing straight tube and the second crossing straight tube are rotationally connected; a first end of the first crossing straight tube is rotationally connected to the second rear frame standing post; and a first end of the second crossing straight tube is rotationally connected to the fold-down sliding sleeve on the second rear frame standing post;

a second end of the first crossing bent tube is rotationally connected to a second end of the first crossing straight tube; and a second end of the second crossing bent tube is rotationally connected to a second end of the second crossing straight tube; and the fold-down sliding sleeve is provided with a clamping assembly; and the clamping assembly is detachably connected to the standing post.

Optionally, the four standing posts include a first standing post, a second standing post, a third standing post, and a fourth standing post;

a first side folding mechanism is hinged between the first standing post and the second standing post; a second side folding mechanism is hinged between the third standing post and the fourth standing post; a third side folding mechanism is hinged between the first standing post and the fourth standing post; and a fourth side folding mechanism is hinged between the second standing post and the third standing post;

the first side folding mechanism and the second side folding mechanism each include a third crossing member, a fourth crossing member, and a fifth crossing member that are sequentially hinged; the third side folding mechanism and the fourth side folding mechanism each include a sixth crossing member and a seventh crossing member that are sequentially hinged;

the third crossing member includes a first connecting rod and a second connecting rod with mutually hinged rod bodies; the fourth crossing member includes a third connecting rod and a fourth connecting rod with mutually hinged rod bodies; the fifth crossing member includes a fifth connecting rod and a sixth connecting rod with mutually hinged rod bodies; the sixth crossing member includes a seventh connecting rod and an eighth connecting rod with mutually hinged rod bodies; and the seventh crossing member includes a ninth connecting rod and a tenth connecting rod with mutually hinged rod bodies;

the first connecting rod, the fourth connecting rod, and the fifth connecting rod are sequentially hinged end to end, while the second connecting rod, the third connecting rod, and the sixth connecting rod are sequentially hinged end to end; the seventh connecting rod is hinged to the tenth connecting rod; and the eighth connecting rod is hinged to the ninth connecting rod;

in the first side folding mechanism, the first connecting rod is hinged to the first fixing member on the first standing post, the second connecting rod is hinged to the sliding sleeve on the first standing post, the fifth connecting rod is hinged to the sliding sleeve on the second standing post, and the sixth connecting rod is hinged to the first fixing member on the second standing post;

in the second side folding mechanism, the first connecting rod is hinged to the first fixing member on the fourth standing post, the second connecting rod is hinged to the sliding sleeve on the fourth standing post, the fifth connecting rod is hinged to the sliding sleeve on the third standing post, and the sixth connecting rod is hinged to the first fixing member on the third standing post;

in the third side folding mechanism, the seventh connecting rod is hinged to the first fixing member on the fourth standing post, the eighth connecting rod is hinged to the sliding sleeve on the fourth standing post, the ninth connecting rod is hinged to the sliding sleeve on the first standing post, and the tenth connecting rod is hinged to the first fixing member on the first standing post; and in the fourth side folding mechanism, the seventh connecting rod is hinged to the first fixing member on the third standing post, the eighth connecting rod is hinged to the sliding sleeve on the third standing post, the ninth connecting rod is hinged to the sliding sleeve on the second standing post, and the tenth connecting rod is hinged to the first fixing member on the second standing post.

Optionally, the upper bottom support mechanism includes a first crossing member and a second crossing member that are mutually hinged; and the first crossing member and the second crossing member are respectively hinged to the second fixing members on corresponding standing posts;

the four side folding mechanisms include a first side folding mechanism and a second side folding mechanism that are opposite to each other and a third side folding mechanism and a fourth side folding mechanism that are opposite to each other; and the first side folding mechanism and the second side folding mechanism each include a third crossing member, a fourth crossing member, and a fifth crossing member;

the third crossing member and the fifth crossing member are respectively hinged to the sliding sleeve and the first fixing member on a corresponding standing post; and a hinge point between the first crossing member and the second crossing member is connected in a sliding manner to the fourth crossing member through the suspension rod.

Optionally, the double-decker wagon further includes a handle mechanism that is hinged to two adjacent standing posts and is telescopic; and a height of each of the side folding mechanism, the upper bottom support mechanism, and the lower bottom support mechanism after being folded is less than or equal to a height of the standing post; and a height of the handle mechanism after being retracted is less than or equal to the height of the standing post.

(III) Beneficial Effects

The double-decker wagon includes an upper decker and a lower decker, which expands the capacity of the wagon. Cloth bags can be provided on the upper decker and the lower decker to place different types of items separately, achieving classified placement of items, greatly facilitating the user to pick and place items.

The side folding mechanisms, the upper bottom support mechanism, and the lower bottom support mechanism are collapsible. When the double-decker wagon is in a folded state, the side folding mechanism is folded between the two adjacent standing posts, reducing the folded volume of the double-decker wagon. When the double-decker wagon is in an unfolded state, i.e. use state, the side folding mechanism is supported between the two adjacent standing posts, forming a side enclosure structure of the double-decker wagon.

The sliding sleeve compensates for the increase in the height of the side folding mechanism by sliding downwards, keeping the top horizontal height of the side folding mechanism unchanged after folding, thereby ensuring that the height of the double-decker wagon remains unchanged after folding and reducing its folded volume.

There is no side enclosure structure provided at a side of the second decker of wagon structure, which facilitates the placement of irregularly sized or large-sized items. Alternatively, a cloth bag can be provided to store small items.

Figure 1:
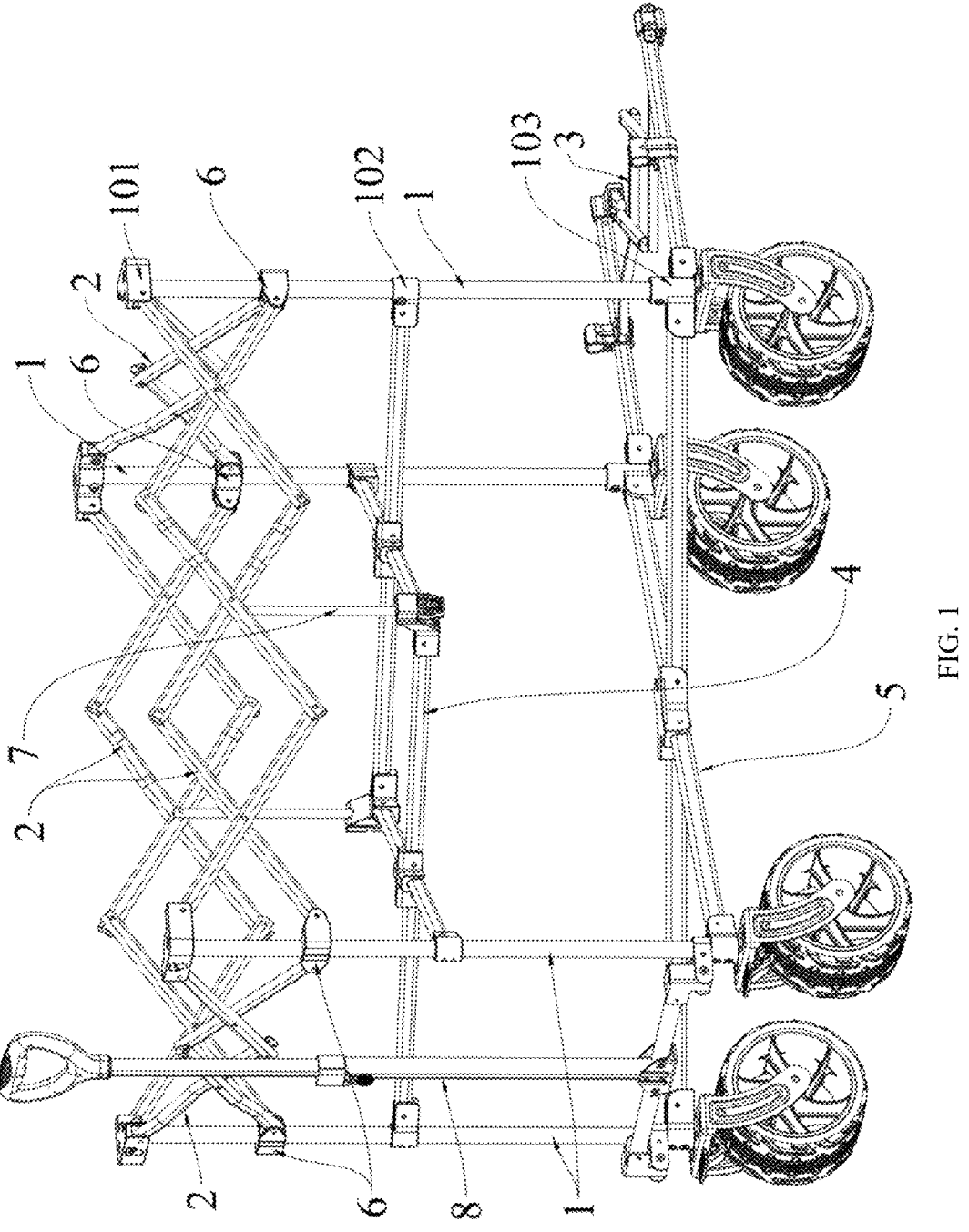
FIG. 1 is a three-dimensional diagram of a double-decker wagon according to the present disclosure.

REFERENCE NUMERALS 1. standing post; 11. first standing post; 12. second standing post; 13. third standing post; 14. fourth standing post; 101. first fixing member; 102. second fixing member; and 103. third fixing member;
2. side folding mechanism;
21. first side folding mechanism; 211. first connecting rod; 212. second connecting rod; 213. third connecting rod; 214. fourth connecting rod; 215. fifth connecting rod; and 216. sixth connecting rod;
22. second side folding mechanism;
23. third side folding mechanism; 231. seventh connecting rod; 232. eighth connecting rod; 233. ninth connecting rod; and 234. tenth connecting rod;
24. fourth side folding mechanism;
3. rear frame mechanism; 31. first rear frame standing post; and 32. second rear frame standing post;
33. rear frame folding assembly; 331. first crossing bent tube; 332. second crossing bent tube; 333. first crossing straight tube; and 334. second crossing straight tube;
34. fold-down sliding sleeve; 35. fold-down fixing member; and 36. clamping assembly;
4. upper bottom support mechanism; 40. first connector; 41. first connecting tube; 42. second connecting tube; 43. third connecting tube; and 44. fourth connecting tube;
5. lower bottom support mechanism; 50. second connector; and 51. fifth connecting tube;

6. sliding sleeve;
7. connecting mechanism; 71. suspension rod; 72. sliding member; and 73. limiting member; and
8. handle mechanism; 80. telescopic rod; 81. first connecting tube; 82. second connecting tube; and 83. handle limiting member.

DETAILED DESCRIPTION OF THE EMBODIMENTS

In order to better explain the present disclosure and facilitate understanding, the present disclosure is described in detail below with reference to the drawings and specific implementations. The terms such as "upper" and "lower" mentioned herein are based on the orientations shown in FIG. 1.

Although the drawings show the exemplary embodiments of the present disclosure, it should be understood that the present disclosure may be implemented in various forms and should not be limited to the embodiments set forth herein. On the contrary, these embodiments are provided such that the present disclosure is fully understandable, and fully conveys the scope of the present disclosure to those skilled in the art.

As shown in FIGS. 1 to 8, the present disclosure provides a double-decker wagon, including an upper decker and a lower decker, which expands the capacity of the wagon. Cloth bags can be provided on the upper decker and the lower decker to place different types of items separately, achieving classified placement of items, greatly facilitating the user to pick and place items. The double-decker wagon includes four spaced rectangular standing posts 1, side folding mechanisms 2 each sequentially hinged between two adjacent standing posts 1, upper bottom support mechanism 4, and lower bottom support mechanism 5. The side folding mechanisms 2, the upper bottom support mechanism 4, and the lower bottom support mechanism 5 are collapsible. When the double-decker wagon is in a folded state, the side folding mechanism 2 is folded between the two adjacent standing posts 1, reducing the folded volume of the double-decker wagon. When the double-decker wagon is in an unfolded state, i.e. use state, the side folding mechanism 2 is supported between the two adjacent standing posts 1, forming a side enclosure structure of the double-decker wagon. The standing posts 1 each are fixedly provided with first fixing member 101, second fixing member 102, and third fixing member 103 in sequence from top to bottom. Sliding sleeve 6 is provided on the standing post 1 in a sliding manner. The sliding sleeve 6 is located between the first fixing member 101 and the second fixing member 102. Therefore, a sliding member can only slide on the standing post 1 between the first fixing member 101 and the second fixing member 102 to make the side folding mechanism 2 unfolded and folded freely. The side folding mechanism 2 includes one leg hinged to the sliding sleeve 6 and the other leg hinged to the first fixing member 101. When the side folding mechanism 2 is folded, its length reduces and height increases. The sliding sleeve 6 compensates for the increase in the height of the side folding mechanism 2 by sliding downwards, keeping the top horizontal height of the side folding mechanism 2 unchanged after folding, thereby ensuring that the height of the double-decker wagon remains unchanged after folding and reducing its folded volume. The upper bottom support mechanism 4 and the lower bottom support mechanism 5 are located in an area enclosed by the four standing posts 1. The second fixing member 102 on a post body of each of the four standing posts 1 is hinged to the upper bottom support mechanism 4. The lower bottom support mechanism 5 forms a second decker of wagon structure. The lower bottom support mechanism 5 is hinged to the third fixing member 103 on the post body of each of the four standing posts 1. In a preferred implementation, the first fixing member 101 can be provided at an upper end or another position of the standing post 1, and the third fixing member 103 can be provided at a lower end or another position of the standing post 1, as long as the first fixing member 101, the second fixing member 102, and the third fixing member 103 are sequentially arranged from top to bottom. There is no side enclosure structure provided at a side of the second decker of wagon structure, which facilitates the placement of irregularly sized or large-sized items. Alternatively, a cloth bag can be provided to store small items.

The upper bottom support mechanism 4 includes a first crossing member and a second crossing member that are mutually hinged. The first crossing member is hinged to the second fixing members 102 on first standing post 11 and fourth standing post 14 of the four standing posts 1, and the second crossing member is hinged to the second fixing members 102 on second standing post 12 and third standing post 13 of the four standing posts 1. The upper bottom support mechanism 4 uses double supporting members, increasing the support strength of the upper bottom support mechanism 4.

Figure 2:
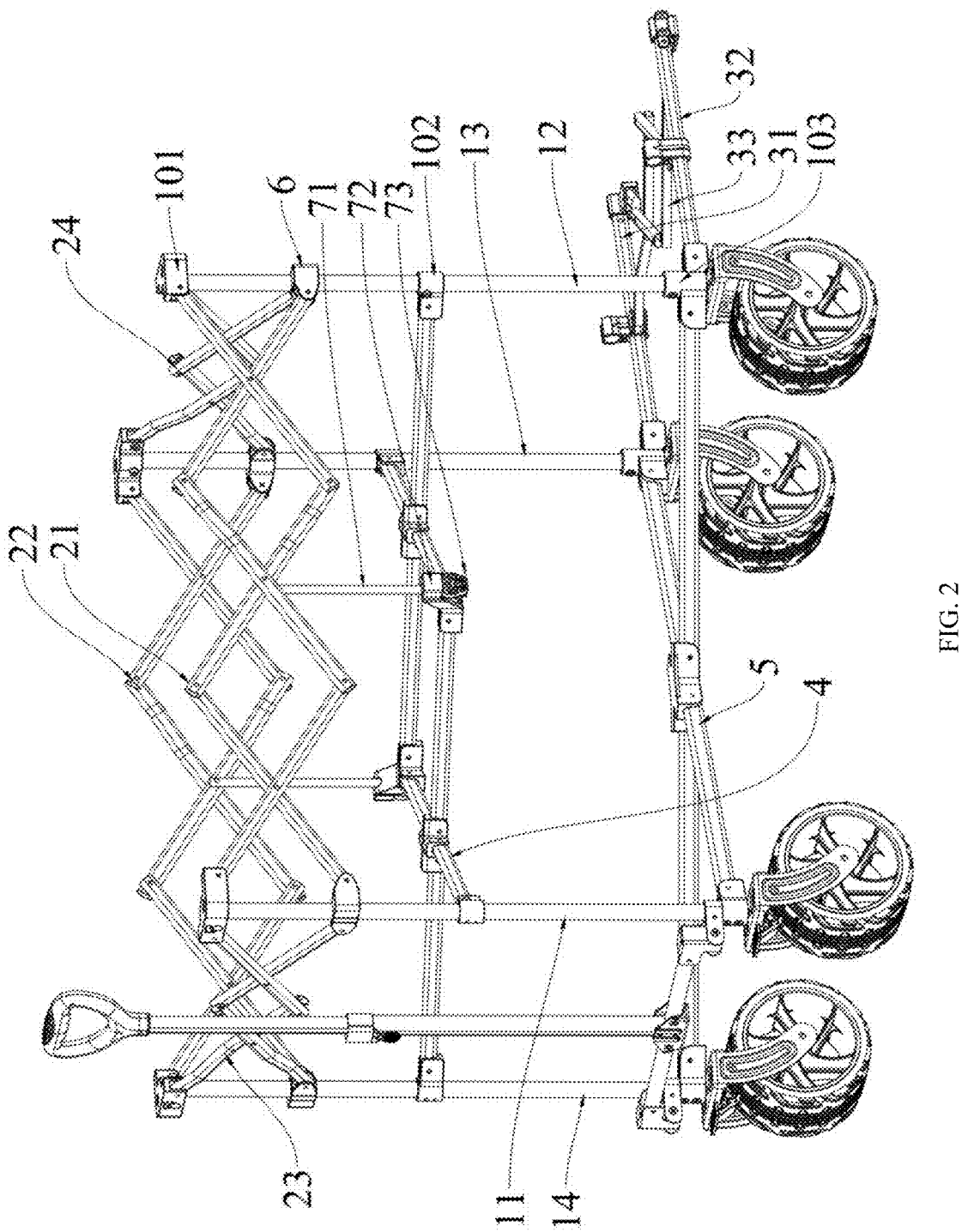
FIG. 2 is a schematic diagram of a side folding mechanism of the double-decker wagon according to the present disclosure.
Figure 3:
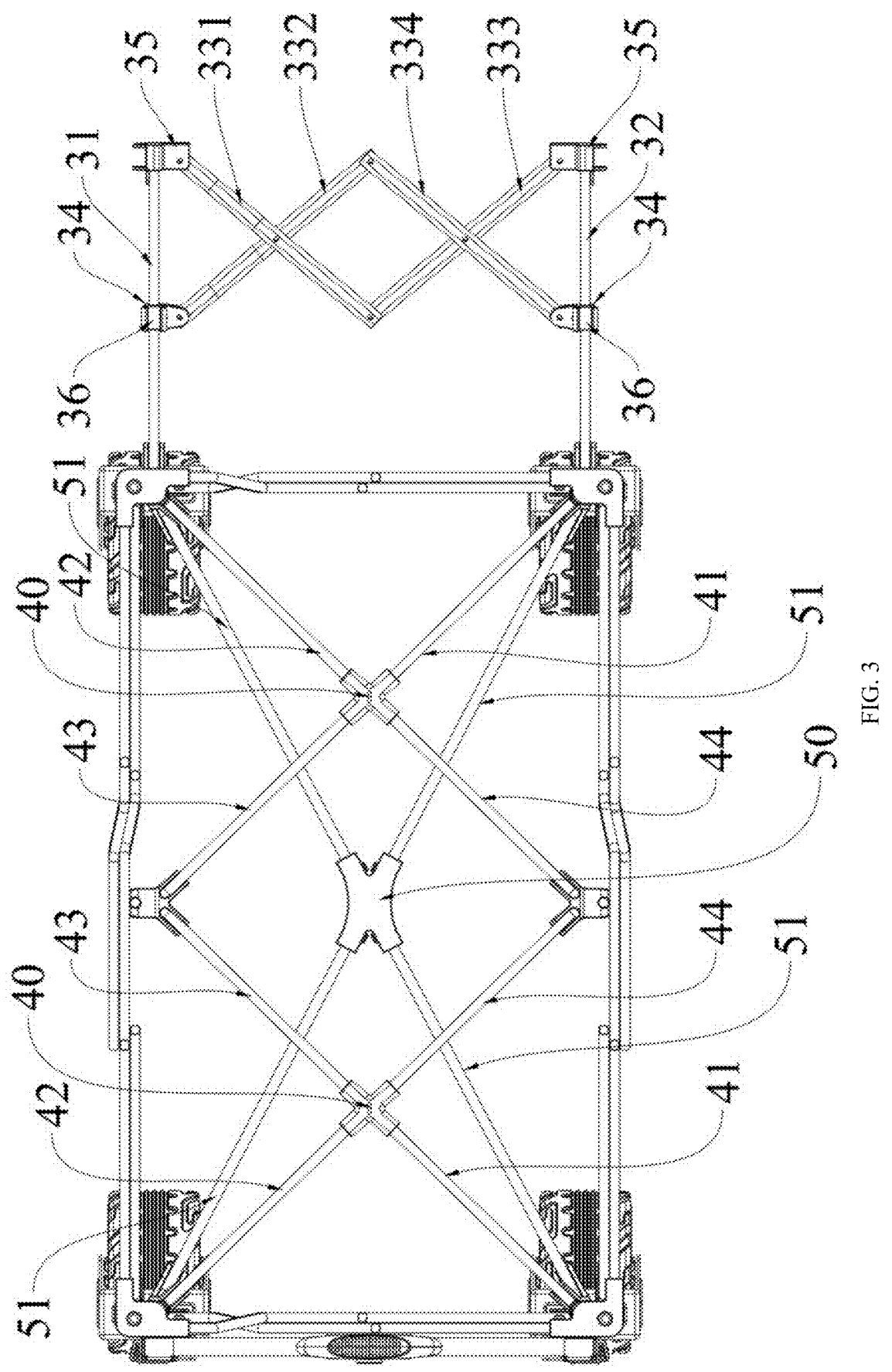
FIG. 3 is a top view of the double-decker wagon according to the present disclosure.

In Embodiment 1, as shown in FIGS. 2 and 3, the first crossing member and the second crossing member each include first connector 40, as well as first connecting tube 41, second connecting tube 42, third connecting tube 43, and fourth connecting tube 44 that are rotationally connected to the first connector 40 at a limited angle. The first connector 40 is provided with four connecting arms respectively facing the four standing posts 1. The connecting arms each are provided with a clamping slot with a horizontal bottom and a notch facing downwards. Referring to FIGS. 2, 3, 6, and 7, when the wagon switches from the folded state to the unfolded state, the connecting tube rotates to the corresponding slot. Due to the clamping slot, the connecting tube cannot continue to rotate and is in a horizontal state. The first connecting tube 41 and the second connecting tube 42 of the first crossing member are respectively rotationally connected to the second fixing members 102 on the post bodies of two standing posts 1 at a limited angle. The first connecting tube 41 and the second connecting tube 42 of the second crossing member are respectively rotationally connected to the second fixing members 102 on the post bodies of the other two standing posts 1 at a limited angle. The third connecting tube 43 and the fourth connecting tube 44 of the first crossing member are respectively rotationally connected to the third connecting tube 43 and the fourth connecting tube 44 of the second crossing member at a limited angle in a sliding manner through sliding sleeve member 72 provided on suspension rod 71. The standing post 1 is provided with a mounting arm for mounting the connecting tube. The mounting arm is provided with a clamping slot with a horizontal bottom and a notch facing upwards. Limited by the clamping slot, the connecting tube cannot continue to rotate and is in a horizontal state. When the wagon is folded, the first connector 40 rises, and the first connecting tube 41, the second connecting tube 42, the third connecting tube 43, and the fourth connecting tube 44 rotate downwards around a connection point on the first connector 40 as a center of rotation and cluster around the first connector 40 as a center.

In Embodiment 2, the upper bottom support mechanism 4 includes two or more crossing members that are sequentially hinged. The connection between the crossing member at each end and the corresponding standing posts 1 is the same as that in case there are only two crossing members.

If the wagon is a large-sized one, it will inevitably increase the size of the upper bottom support mechanism 4. In the present application, the upper bottom support mechanism 4 includes two or more supporting members, shortening the length of the connecting tube. If the upper bottom support mechanism 4 includes only one supporting member, the connecting tube will be too long, causing the horizontal height of the first connector 40 after folding to be greater than the top horizontal height of the standing post 1, thereby increasing the height of the wagon after folding.

Figure 4:
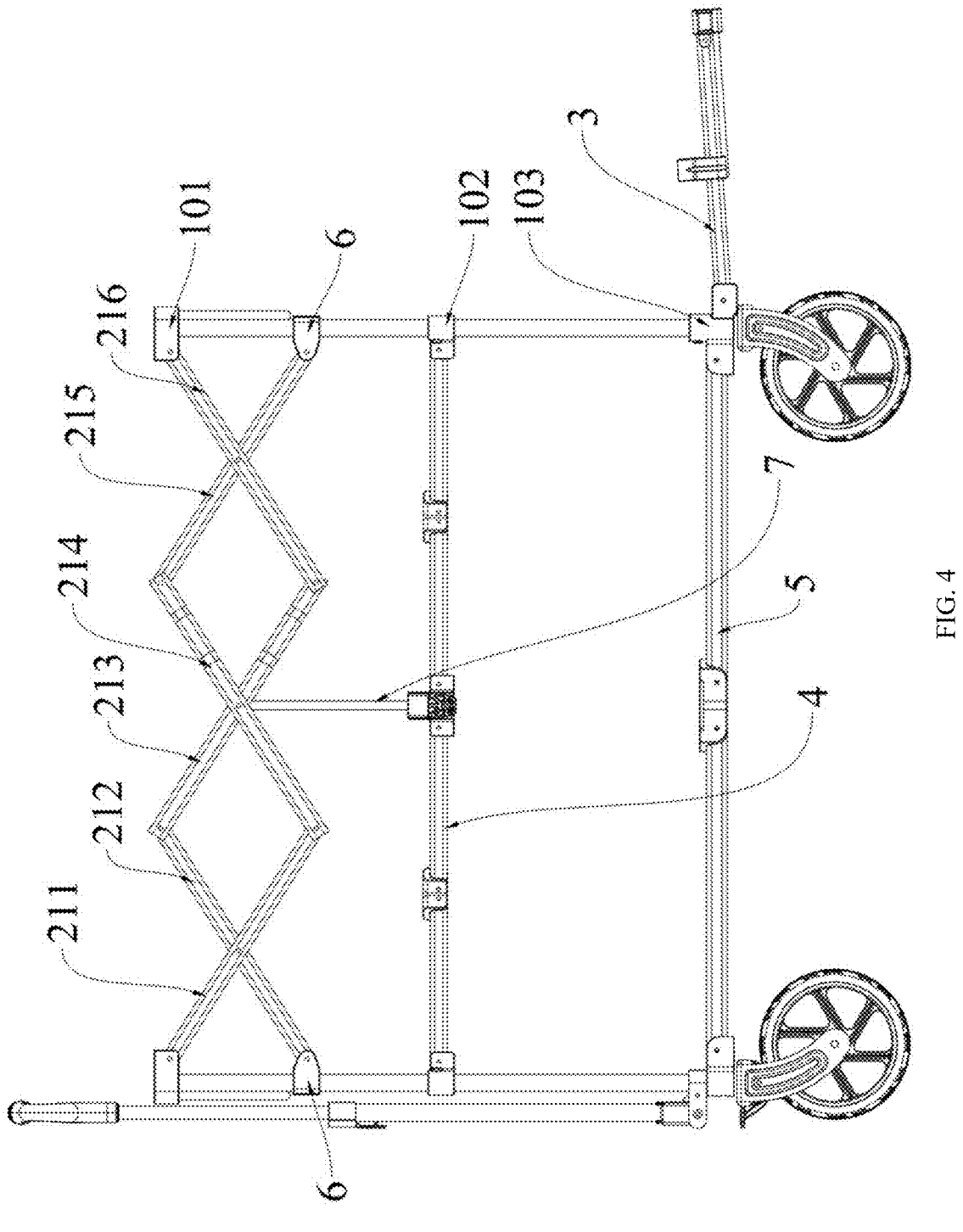
FIG. 4 is a front view of the double-decker wagon according to the present disclosure.

As shown in FIGS. 2 and 4, the double-decker wagon further includes a pair of connecting mechanisms 7 that are respectively located at front and rear sides. The connecting mechanisms 7 each include the suspension rod 71, the sliding member 72, and limiting member 73. The sliding member 72 is provided on the suspension rod 71 in a sliding manner, and the limiting member 73 is provided at a first end of the suspension rod 71 to prevent the sliding member 72 from slipping off from the first end of the suspension rod 71. A second end of the suspension rod 71 is hinged to a middle hinge point of the side folding mechanism 2 at a same side. The third connecting tubes 43 of the first crossing member and the second crossing member each are rotationally connected to the adjacent sliding member 72 at a limited angle, while the fourth connecting tubes 44 of the first crossing member and the second crossing member each are rotationally connected to the adjacent sliding member 72 at a limited angle. For the connection form, please refer to the connection form between the standing post 1 and the first connecting tube 41, which will not be repeated herein. When the wagon is in the unfolded state, the sliding member 72 abuts against the limiting member 73, and the suspension rod 71 assists in supporting the upper bottom support mechanism 4, further increasing the strength of the upper bottom support mechanism 4.

As shown in FIGS. 1 to 3, the lower bottom support mechanism 5 includes second connector 50 and four fifth connecting tubes 51 that are rotationally connected to the second connector 50 at a limited angle. The four fifth connecting tubes 51 are respectively rotationally connected to the third fixing members 103 on the four standing posts 1 at a limited angle. For the connection form, please refer to the connection form between the first connecting tube 41 and the standing post 1, which will not be repeated herein. When the wagon is folded, the second connector 50 rises, and the four fifth connecting tubes 51 rotate downwards around a connection point on the second connector 50 as a center of rotation, and the four fifth connecting tubes 51 cluster around the second connector 50. In other implementations, the lower bottom support mechanism 5 can also include two or more supporting members. In the present application, taking into account the folded volume, weight, support strength, and unfolded volume of the wagon, the upper bottom support mechanism 4 preferably includes two supporting members, and the lower bottom support mechanism 5 preferably includes one supporting member.

As shown in FIGS. 1 to 4, the double-decker wagon further includes rear frame mechanism 3. One end of the rear frame mechanism 3 is rotationally connected to lower ends of the second standing post 12 and the third standing post 13 at a limited angle. The rear frame mechanism 3 can only rotate from a vertical state to a near horizontal state to expand the lower bottom support mechanism 5, making it easy to pick and place large items. The rear frame mechanism 3 includes first rear frame standing post 31, second rear frame standing post 32, and rear frame folding assembly 33. The rear frame folding assembly 33 is connected between the first rear frame standing post 31 and the second rear frame standing post 32. When the double-decker wagon is folded and unfolded, the rear frame folding assembly 33 is correspondingly folded and unfolded to reduce the folded volume of the rear frame mechanism 3. A first end of the first rear frame standing post 31 is rotationally connected to a lower end of the third standing post 13 at a limited angle, while a first end of the second rear frame standing post 32 is rotationally connected to a lower end of the second standing post 12 at a limited angle. Specifically, the lower ends of the second standing post 12 and the third standing post 13 each are provided with a limiting arm. The limiting arm is provided with a limiting groove that is open upward. The limiting groove runs through the entire limiting arm, and a bottom of the limiting groove is close to horizontal. The first ends of the first rear frame standing post 31 and the second rear frame standing post 32 are respectively rotationally connected to the limiting grooves of the third standing post 13 and the second standing post 12 through a rotating shaft. When the first rear frame standing post 31 and the second rear frame standing post 32 are unfolded and clamped into the limiting grooves, a rod body at the first end abuts against a bottom of the groove and cannot continue to rotate. In this way, the first rear frame standing post 31 and the second rear frame standing post 32 have supporting force and can hold items, expanding the support area of the upper bottom support mechanism 4.

Figure 6:
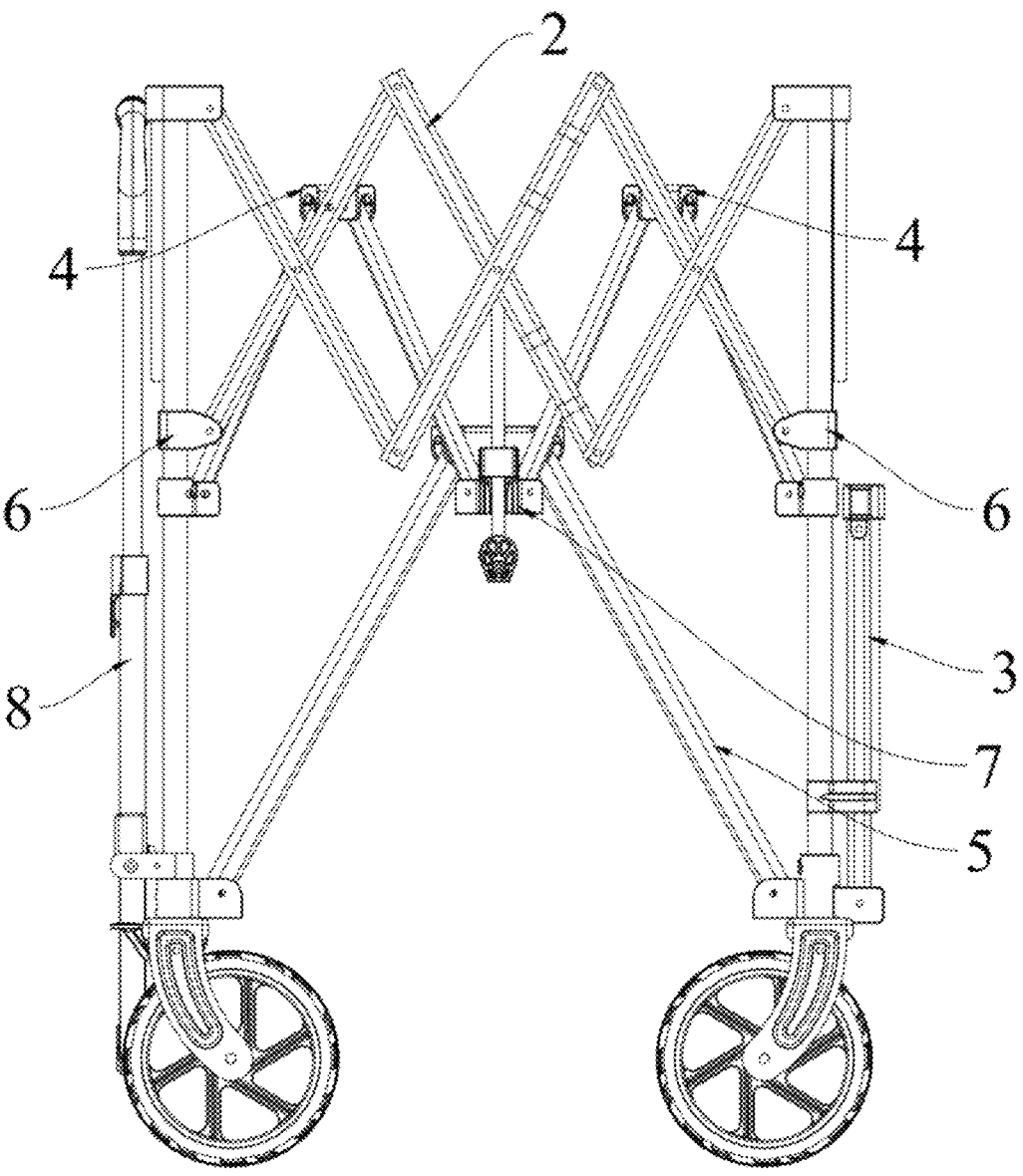
FIG. 6 is a structural diagram of the double-decker wagon in a half-folded state according to the present disclosure.
Figure 7:
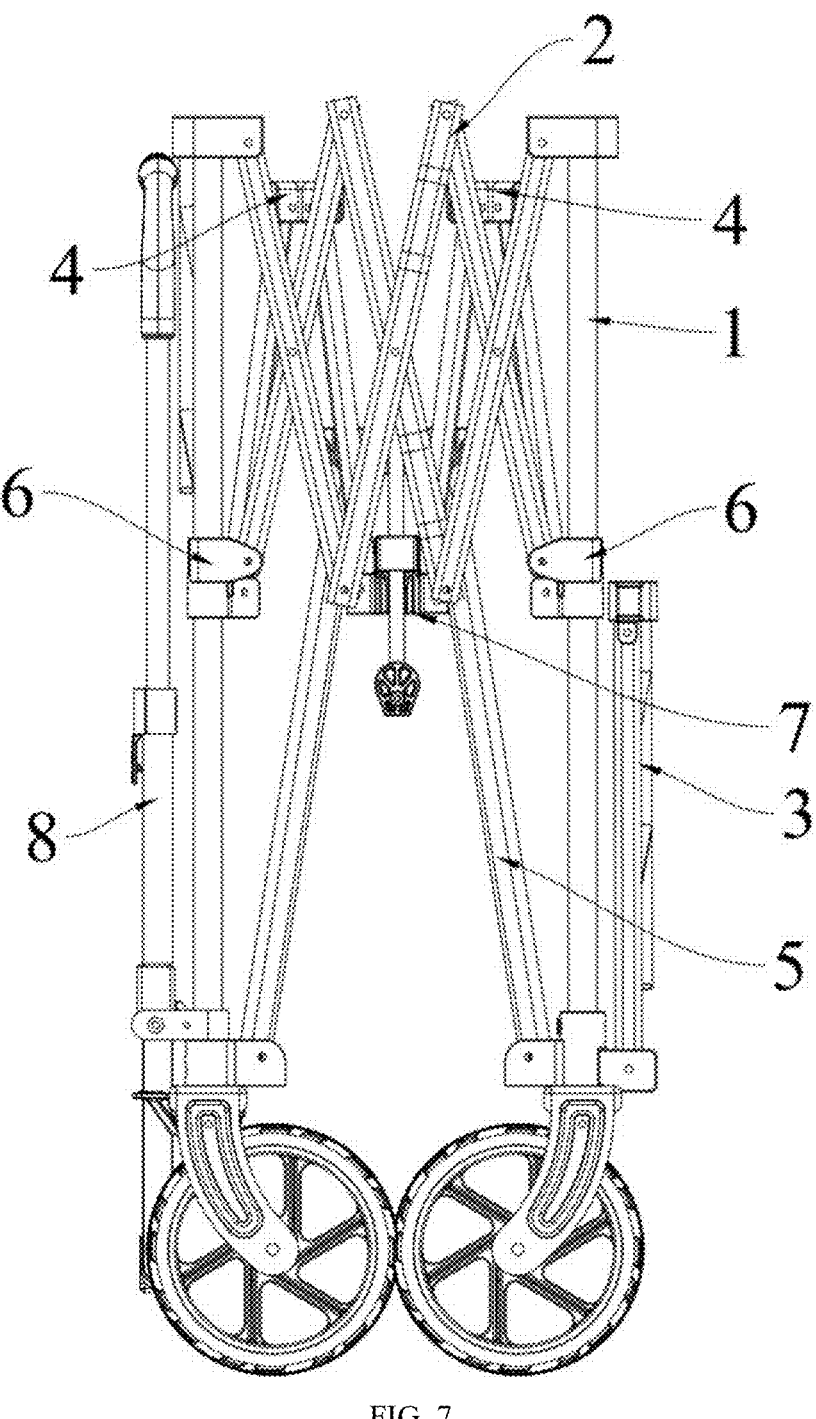
FIG. 7 is a front view of the double-decker wagon in a folded state according to the present disclosure.
Figure 8:
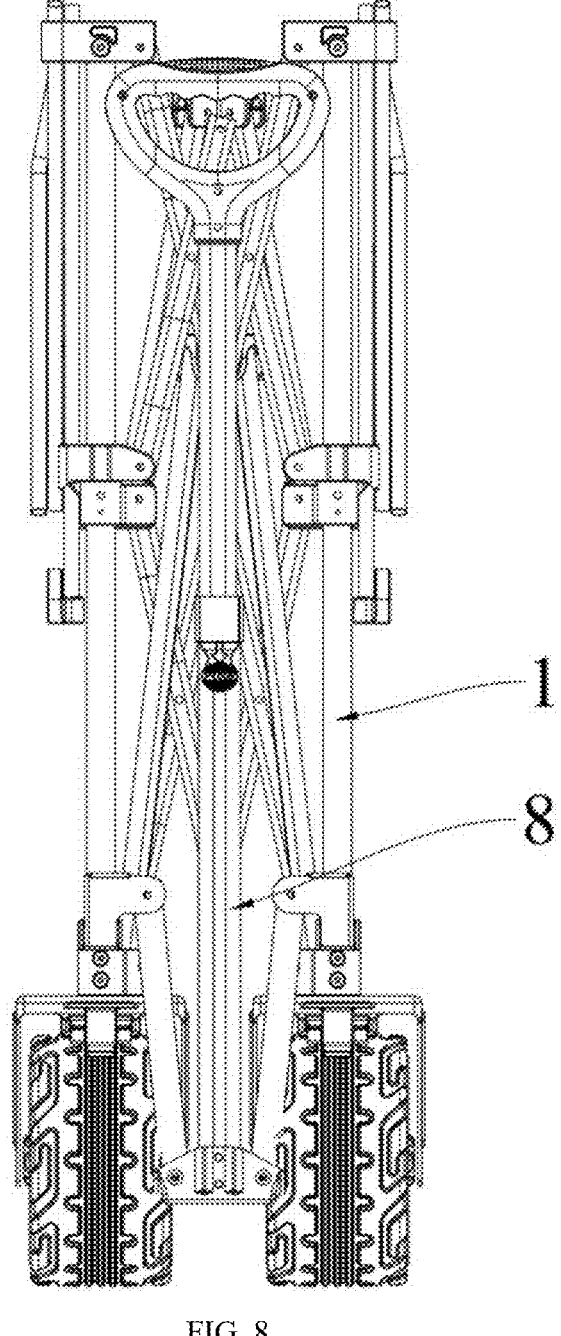
FIG. 8 is a left view of the double-decker wagon in the folded state according to the present disclosure.

As shown in FIGS. 1 to 4, the first rear frame standing post 31 and the second rear frame standing post 32 each are provided with fold-down sliding sleeve 34 in a sliding manner. The fold-down sliding sleeve 34 is slidable on the standing post 1. Second ends of the first rear frame standing post 31 and the second rear frame standing post 32 each are provided with fold-down fixing member 35. The fold-down fixing member 35 and the fold-down sliding sleeve 34 on the first rear frame standing post 31 are respectively connected to first ends of the rear frame folding assembly 33, and the fold-down fixing member 35 and the fold-down sliding sleeve 34 on the second rear frame standing post 32 are respectively connected to second ends of the rear frame folding assembly 33. The fold-down sliding sleeve 34 is provided with clamping assembly 36. The clamping assembly 36 includes a connecting part and a clamping part that are connected to each other. The connecting part is connected to the fold-down sliding sleeve 34. The clamping part is provided with a clamping slot, with a notch narrower than a middle part. Referring to FIGS. 6 and 7, when the fold-down mechanism is in a storage state, the clamping parts on the first rear frame standing post 31 and the second rear frame standing post 32 are respectively clamped to the rod bodies of the second standing post 12 and the third standing post 13, and the clamping parts remain stably connected to the corresponding standing posts 1 without external force. In a preferred implementation, the connecting part, the clamping part, and the fold-down sliding sleeve 34 are integrally formed, and are arranged on the corresponding standing post 1 in a sliding manner through the fold-down sliding sleeve 34. Specifically, the rear frame folding assembly 33 includes first crossing bent tube 331, second crossing bent tube 332, first crossing straight tube 333, and second crossing straight tube 334. Middle parts of tube bodies of the first crossing bent tube 331 and the second crossing bent tube 332 are rotationally connected through a rotating shaft. A first end of the first crossing bent tube 331 is rotationally connected to the fold-down fixing member 35 on the first rear frame standing post 31 through a rotating shaft. A first end of the second crossing bent tube 332 is rotationally connected to the fold-down sliding sleeve 34 on the first rear frame standing post 31 through a rotating shaft. Middle parts of tube bodies of the first crossing straight tube 333 and the second crossing straight tube 334 are rotationally connected through a rotating shaft. A first end of the first crossing straight tube 333 is rotationally connected to the fold-down fixing member 35 on the second rear frame standing post 32 through a rotating shaft, and a first end of the second crossing straight tube 334 is rotationally connected to the fold-down sliding sleeve 34 on the second rear frame standing post 32 through a rotating shaft. A second end of the first crossing bent tube 331 is rotationally connected to a second end of the first crossing straight tube 333 through a rotating shaft, and a second end of the second crossing bent tube 332 is rotationally connected to a second end of the second crossing straight tube 334 through a rotating shaft. When the double-decker wagon is folded, the rear frame folding assembly 33 is folded synchronously. At this point, the first rear frame standing post 31 and the second rear frame standing post 32 are close to each other, and the fold-down sliding sleeves 34 slide downwards. The first crossing bent tube 331, the second crossing bent tube 332, the first crossing straight tube 333, and the second crossing straight tube 334 cross and rotate to a limit position. Limited by the rear frame folding assembly 33, the fold-down sliding sleeves 34 cannot rotate when sliding along the standing posts 1, ensuring that the clamping slots of the clamping parts always face the second standing post 12 and the third standing post 13.

Figure 5:
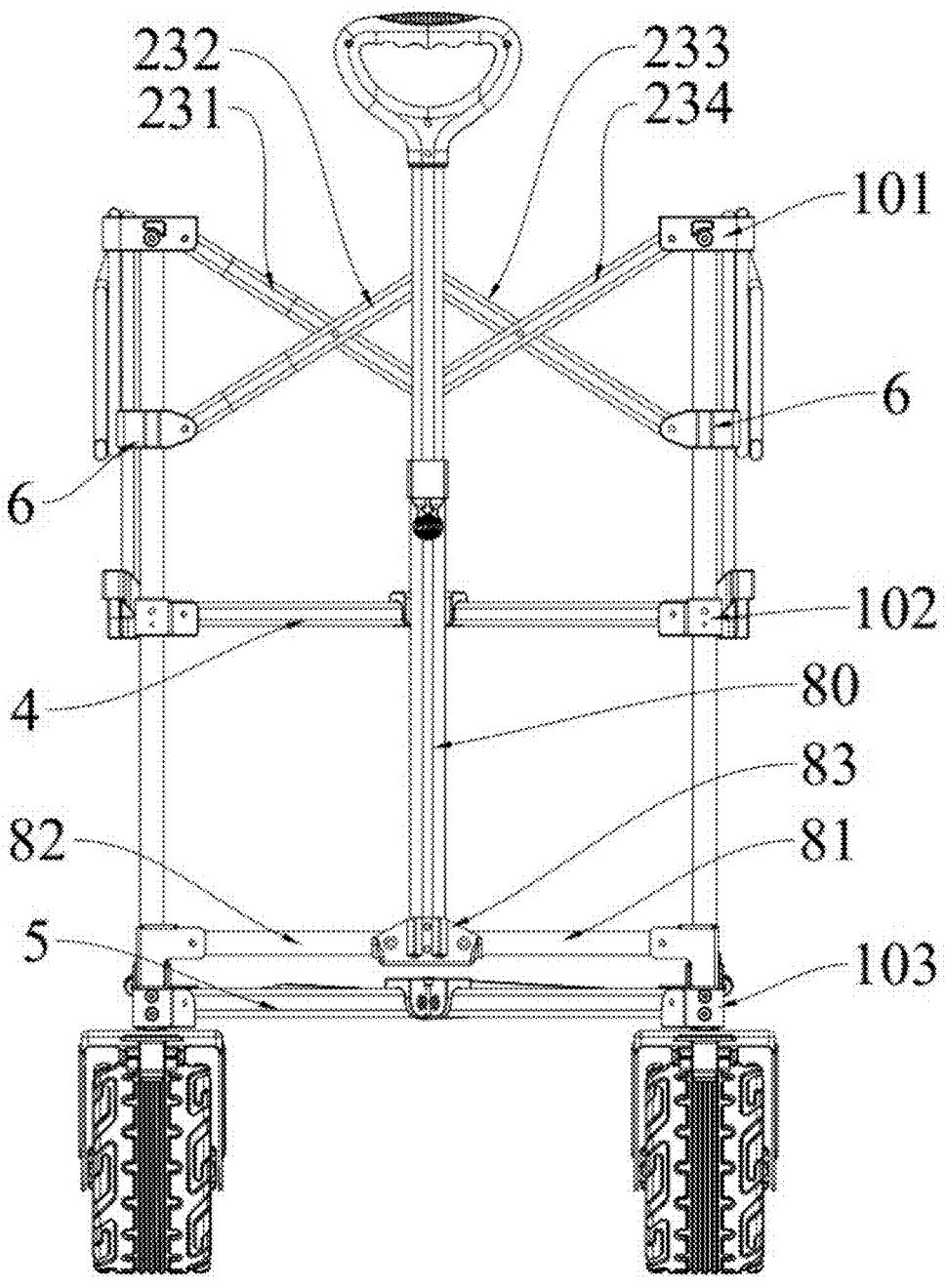
FIG. 5 is a left view of the double-decker wagon according to the present disclosure.

Referring to FIG. 2, the four standing posts 1 include the first standing post 11, the second standing post 12, the third standing post 13, and the fourth standing post 14. First side folding mechanism 21 is hinged between the first standing post 11 and the second standing post 12. Second side folding mechanism 22 is hinged between the third standing post 13 and the fourth standing post 14. Third side folding mechanism 23 is hinged between the first standing post 11 and the fourth standing post 14. Fourth side folding mechanism 24 is hinged between the second standing post 12 and the third standing post 13. The first side folding mechanism 21 and the second side folding mechanism 22 each include a third crossing member, a fourth crossing member, and a fifth crossing member that are sequentially hinged. In other implementations, they may also include more than three sequentially hinged crossing members. The third side folding mechanism 23 and the fourth side folding mechanism 24 each include a sixth crossing member and a seventh crossing member that are sequentially hinged. In other implementations, they may also include more than two crossing members. Referring to FIGS. 4 and 5, the third crossing member includes first connecting rod 211 and second connecting rod 212 with mutually hinged rod bodies, the fourth crossing member includes third connecting rod 213 and fourth connecting rod 214 with mutually hinged rod bodies, and the fifth crossing member includes fifth connecting rod 215 and sixth connecting rod 216 with mutually hinged rod bodies. The sixth crossing member includes seventh connecting rod 231 and eighth connecting rod 232 with mutually hinged rod bodies, and the seventh crossing member includes ninth connecting rod 233 and tenth connecting rod 234 with mutually hinged rod bodies. The first connecting rod 211, the fourth connecting rod 214, and the fifth connecting rod 215 are sequentially hinged end to end, while the second connecting rod 212, the third connecting rod 213, and the sixth connecting rod 216 are sequentially hinged end to end. The seventh connecting rod 231 is hinged to the tenth connecting rod 234, and the eighth connecting rod 232 is hinged to the ninth connecting rod 233. Referring to FIG. 4, taking the first side folding mechanism 21 as an example, in the first side folding mechanism 21, the first connecting rod 211 is hinged to the first fixing member 101 on the first standing post 11, the second connecting rod 212 is hinged to the sliding sleeve 6 on the first standing post 11, the fifth connecting rod 215 is hinged to the sliding sleeve 6 on the second standing post 12, and the sixth connecting rod 216 is hinged to the first fixing member 101 on the second standing post 12. Similarly, in the second side folding mechanism 22, the first connecting rod 211 is hinged to the first fixing member 101 on the fourth standing post 14, the second connecting rod 212 is hinged to the sliding sleeve 6 on the fourth standing post 14, the fifth connecting rod 215 is hinged to the sliding sleeve 6 on the third standing post 13, and the sixth connecting rod 216 is hinged to the first fixing member 101 on the third standing post 13. Referring to FIG. 5, taking the third side folding mechanism 23 as an example, in the third side folding mechanism 23, the seventh connecting rod 231 is hinged to the first fixing member 101 on the fourth standing post 14, the eighth connecting rod 232 is hinged to the sliding sleeve 6 on the fourth standing post 14, the ninth connecting rod 233 is hinged to the sliding sleeve 6 on the first standing post 11, and the tenth connecting rod 234 is hinged to the first fixing member 101 on the first standing post 11. Similarly, in the fourth side folding mechanism 24, the seventh connecting rod 231 is hinged to the first fixing member 101 on the third standing post 13, the eighth connecting rod 232 is hinged to the sliding sleeve 6 on the third standing post 13, the ninth connecting rod 233 is hinged to the sliding sleeve 6 on the second standing post 12, and the tenth connecting rod 234 is hinged to the first fixing member 101 on the second standing post 12.

As shown in FIGS. 1 to 8, the double-decker wagon further includes handle mechanism 8. The handle mechanism 8 includes telescopic rod 80, first connecting tube 81, and second connecting tube 82. First ends of the first connecting tube 81 and the second connecting tube 82 are rotationally connected to a first end of the telescopic rod 80 at a limited angle. Second ends of the first connecting tube 81 and the second connecting tube 82 are respectively hinged to two adjacent standing posts 1. When the wagon is folded, the four telescopic standing posts are close to each other. The first side folding mechanism 21 is folded between the first standing post 11 and the second standing post 12, the second side folding mechanism 22 is folded between the third standing post 13 and the fourth standing post 14, the third side folding mechanism 23 is folded between the first standing post 11 and the third standing post 13, and the fourth side folding mechanism 24 is folded between the second standing post 12 and the fourth standing post 14. The upper bottom support mechanism 4 and the lower bottom support mechanism 5 are folded upwards between the four standing posts 1. The height of each of the first side folding mechanism 21, the second side folding mechanism 22, the third side folding mechanism 23, the fourth side folding mechanism 24, the upper bottom support mechanism 4, and the lower bottom support mechanism 5 after being folded is less than or equal to the height of the standing post 1. The overall height of the handle mechanism 8 after the telescopic rod 80 is retracted is less than or equal to the height of the standing post 1. The design effectively reduces the folded volume of the wagon. Specifically, a lower end of the telescopic rod 80 is connected to handle limiting member 83. The first end of the first connecting tube 81 is rotationally connected to a first side of the handle limiting member 83, and the first end of the second connecting tube 82 is rotationally connected to a second side of the handle limiting member 83. The first side of handle limiting member 83 is opposite to the first standing post 11, and the second side of handle limiting member 83 is opposite to the fourth standing post 14. The first connecting tube 81 and the second connecting tube 82 are limited by the handle limiting member 83. Therefore, the first tube 81 and the second tube 82 can only rotate downwards from a tilted upward state when the wagon is folded to a horizontal state when the wagon is unfolded, or upwards from the horizontal state when the wagon is unfolded. The first connecting tube 81 and the second connecting tube 82 cannot continue to rotate downwards from the horizontal state. The second end of the first connecting tube 81 is rotationally connected to the lower end of the first standing post 11, and the second end of the second connecting tube 82 is rotationally connected to the lower end of the fourth standing post 14. When the first connecting tube 81 and the second connecting tube 82 rotate around a rotating shaft of the second end, a free end of the telescopic rod 80 moves away from the wagon frame or close to the wagon. When the free end of the telescopic rod 80 moves away from the wagon, the telescopic rod 80 is at a certain angle with a plane where the fourth standing post 14 and the first standing post 11 are located, making it convenient for the user to drag. A second end of the telescopic rod 80 is connected to a pull ring, further facilitating the user to drag the wagon. A caster is provided at a bottom of each of the first standing post 11, the second standing post 12, the third standing post 13, and the fourth standing post 14. Preferably, the caster provided at the bottom of each of the first standing post 11 and the fourth standing post 14 is a universal wheel, which facilitates the movement of the wagon.

It should be understood that in the description of the present disclosure, terms such as "first" and "second" are used merely for a descriptive purpose, and should not be construed as indicating or implying relative importance, or implicitly indicating the number of indicated technical features. Thus, features defined with "first" and "second" may explicitly or implicitly include one or more of the features. In the description of the present disclosure, the term "a plurality of" means two or more, unless otherwise specifically defined.

In the present disclosure, unless otherwise clearly specified, the terms "installation", "interconnection", "connection" and "fixation" are intended to be understood in a broad sense. For example, the "connection" may be a fixed connection, removable connection or integral connection; may be a mechanical connection or electrical connection; may be a direct connection or indirect connection using a medium; and may be a communication or interaction between two elements. Those of ordinary skill in the art may understand the specific meanings of the above terms in the present disclosure based on specific situations.

In the present disclosure, unless otherwise explicitly stipulated, "a first feature is above or below a second feature" may indicate that "the first and second features are in direct contact" or "the first and second features are in indirect contact through an intermediate feature". In addition, when it is described that the first feature is "over", "above" and "on" the second feature, it indicates that the first feature is directly or obliquely above the second feature, or simply indicates that the horizontal height of the first feature is greater than that of the second feature. When it is described that a first feature is "under", "below" or "beneath" a second feature, it indicates that the first feature is directly or obliquely under the second feature or simply indicates that the horizontal height of the first feature is lower than that of the second feature.

In the description of this specification, the description with reference to the terms such as "one embodiment", "some embodiments", "embodiments", "an example", "a specific example" and "some examples" indicate that the specific features, structures, materials, or characteristics described with reference to the embodiment or example are included in at least one embodiment or example of the present disclosure. In this specification, the schematic expression of the above terms is not necessarily directed to the same embodiment or example. Moreover, the specific features, structures, materials, or characteristics described may be combined in a suitable manner in any one or more embodiments or examples. In addition, those skilled in the art may combine different embodiments or examples described in this specification and characteristics of the different embodiments or examples without any contradiction.

Although the embodiments of the present disclosure have been described above, it should be understood that the above embodiments are exemplary, and may not be construed as limitations to the present disclosure. A person of ordinary skill in the art may make various changes, modifications, replacements and variations on the above embodiments within the scope of the present disclosure.

What is claimed is:

1. A double-decker wagon, comprising four spaced rectangular standing posts, four side folding mechanisms each sequentially hinged between two adjacent standing posts, an upper bottom support mechanism, and a lower bottom support mechanism, wherein the four standing posts each are fixedly provided with a first fixing member, a second fixing member, and a third fixing member in sequence from top to bottom; and a sliding sleeve is provided in a sliding manner on the standing post between the first fixing member and the second fixing member;

the side folding mechanism is hinged to the sliding sleeve and the first fixing member on the standing post;

the upper bottom support mechanism is hinged to the second fixing members on the four standing posts;

the lower bottom support mechanism is hinged to the third fixing members on the four standing posts; and the four side folding mechanisms, the upper bottom support mechanism, and the lower bottom support mechanism are collapsible.

2. The double-decker wagon according to claim 1, wherein the upper bottom support mechanism comprises at least a first crossing member and a second crossing member, wherein the first crossing member and the second crossing member are sequentially hinged; and the first crossing member is hinged to the second fixing members on first two standing posts, and the second crossing member is hinged to the second fixing members on second two standing posts.

3. The double-decker wagon according to claim 2, wherein the first crossing member and the second crossing member each comprise a first connector, as well as a first connecting tube, a second connecting tube, a third connecting tube, and a fourth connecting tube, wherein the first connecting tube, the second connecting tube, the third connecting tube, and the fourth connecting tube are rotationally connected to the first connector at a first limited angle;

the first connecting tube and the second connecting tube of the first crossing member are respectively rotationally connected to the second fixing members on the first two standing posts at a second limited angle; the first connecting tube and the second connecting tube of the second crossing member are respectively rotationally connected to the second fixing members on the second two standing posts at a third limited angle; and the third connecting tube and the fourth connecting tube of the first crossing member are respectively rotationally connected to the third connecting tube and the fourth connecting tube of the second crossing member at a fourth limited angle.

4. The double-decker wagon according to claim 3, wherein the double-decker wagon further comprises a pair of connecting mechanisms, wherein the pair of connecting mechanisms are respectively located at front and rear sides;

the pair of connecting mechanisms each comprise a suspension rod, a sliding member, and a limiting member;

the sliding member is provided on the suspension rod in the sliding manner; the limiting member is provided at a first end of the suspension rod; and a second end of the suspension rod is hinged to the side folding mechanism at a same side; and the third connecting tubes of the first crossing member and the second crossing member are rotationally connected to a first adjacent sliding member at a fifth limited angle, while the fourth connecting tubes of the first crossing member and the second crossing member are rotationally connected to a second adjacent sliding member at a sixth limited angle.

5. The double-decker wagon according to claim 1, wherein the lower bottom support mechanism comprises a second connector and four fifth connecting tubes, wherein the four fifth connecting tubes are rotationally connected to the second connector at a first limited angle; and the four fifth connecting tubes are respectively rotationally connected to the third fixing members on the four standing posts at a second limited angle.

6. The double-decker wagon according to claim 1, wherein the double-decker wagon further comprises a rear frame mechanism; and one end of the rear frame mechanism is rotationally connected to lower ends of two adjacent standing posts at a limited angle.

7. The double-decker wagon according to claim 6, wherein the rear frame mechanism comprises a first rear frame standing post, a second rear frame standing post, and a rear frame folding assembly; and the rear frame folding assembly is connected between the first rear frame standing post and the second rear frame standing post; and first ends of the first rear frame standing post and the second rear frame standing post are respectively rotationally connected to the lower ends of the two adjacent standing posts at the limited angle.

8. The double-decker wagon according to claim 7, wherein the first rear frame standing post and the second rear frame standing post each are provided with a fold-down sliding sleeve in the sliding manner; and the rear frame folding assembly comprises a first crossing bent tube, a second crossing bent tube, a first crossing straight tube, and a second crossing straight tube;

the first crossing bent tube and the second crossing bent tube are rotationally connected; a first end of the first crossing bent tube is rotationally connected to the first rear frame standing post; and a first end of the second crossing bent tube is rotationally connected to the fold-down sliding sleeve on the first rear frame standing post;

the first crossing straight tube and the second crossing straight tube are rotationally connected; a first end of the first crossing straight tube is rotationally connected to the second rear frame standing post; and a first end of the second crossing straight tube is rotationally connected to the fold-down sliding sleeve on the second rear frame standing post;

a second end of the first crossing bent tube is rotationally connected to a second end of the first crossing straight tube; and a second end of the second crossing bent tube is rotationally connected to a second end of the second crossing straight tube; and the fold-down sliding sleeve is provided with a clamping assembly; and the clamping assembly is detachably connected to the standing post.

9. The double-decker wagon according to claim 1, wherein the four standing posts comprise a first standing post, a second standing post, a third standing post, and a fourth standing post;

a first side folding mechanism is hinged between the first standing post and the second standing post; a second side folding mechanism is hinged between the third standing post and the fourth standing post; a third side folding mechanism is hinged between the first standing post and the fourth standing post; and a fourth side folding mechanism is hinged between the second standing post and the third standing post;

the first side folding mechanism and the second side folding mechanism each comprise a third crossing member, a fourth crossing member, and a fifth crossing member, wherein the third crossing member, the fourth crossing member, and the fifth crossing member are sequentially hinged; and the third side folding mechanism and the fourth side folding mechanism each comprise a sixth crossing member and a seventh crossing member, wherein the sixth crossing member and the seventh crossing member are sequentially hinged;

the third crossing member comprises a first connecting rod and a second connecting rod with mutually hinged first rod bodies; the fourth crossing member comprises a third connecting rod and a fourth connecting rod with mutually hinged second rod bodies; the fifth crossing member comprises a fifth connecting rod and a sixth connecting rod with mutually hinged third rod bodies; the sixth crossing member comprises a seventh connecting rod and an eighth connecting rod with mutually hinged fourth rod bodies; and the seventh crossing member comprises a ninth connecting rod and a tenth connecting rod with mutually hinged fifth rod bodies;

the first connecting rod, the fourth connecting rod, and the fifth connecting rod are sequentially hinged end to end, while the second connecting rod, the third connecting rod, and the sixth connecting rod are sequentially hinged end to end; the seventh connecting rod is hinged to the tenth connecting rod; and the eighth connecting rod is hinged to the ninth connecting rod;

in the first side folding mechanism, the first connecting rod is hinged to the first fixing member on the first standing post, the second connecting rod is hinged to the sliding sleeve on the first standing post, the fifth connecting rod is hinged to the sliding sleeve on the second standing post, and the sixth connecting rod is hinged to the first fixing member on the second standing post;

in the second side folding mechanism, the first connecting rod is hinged to the first fixing member on the fourth standing post, the second connecting rod is hinged to the sliding sleeve on the fourth standing post, the fifth connecting rod is hinged to the sliding sleeve on the third standing post, and the sixth connecting rod is hinged to the first fixing member on the third standing post;

in the third side folding mechanism, the seventh connecting rod is hinged to the first fixing member on the fourth standing post, the eighth connecting rod is hinged to the sliding sleeve on the fourth standing post, the ninth connecting rod is hinged to the sliding sleeve on the first standing post, and the tenth connecting rod is hinged to the first fixing member on the first standing post; and in the fourth side folding mechanism, the seventh connecting rod is hinged to the first fixing member on the third standing post, the eighth connecting rod is hinged to the sliding sleeve on the third standing post, the ninth connecting rod is hinged to the sliding sleeve on the second standing post, and the tenth connecting rod is hinged to the first fixing member on the second standing post.

10. The double-decker wagon according to claim 1, wherein the upper bottom support mechanism comprises a first crossing member and a second crossing member, wherein the first crossing member and the second crossing member are mutually hinged; and the first crossing member and the second crossing member are respectively hinged to the second fixing members on corresponding standing posts;

the four side folding mechanisms comprise a first side folding mechanism, a second side folding mechanism, a third side folding mechanism, and a fourth side folding mechanism, wherein the first side folding mechanism and the second side folding mechanism are opposite to each other, and the third side folding mechanism and the fourth side folding mechanism are opposite to each other; and the first side folding mechanism and the second side folding mechanism each comprise a third crossing member, a fourth crossing member, and a fifth crossing member;

the third crossing member and the fifth crossing member are respectively hinged to the sliding sleeve and the first fixing member on a corresponding standing post; and a hinge point between the first crossing member and the second crossing member is connected in the sliding manner to the fourth crossing member through a suspension rod.

11. The double-decker wagon according to claim 1, wherein the double-decker wagon further comprises a handle mechanism, wherein the handle mechanism is hinged to two adjacent standing posts and is telescopic; and a height of each of the side folding mechanism, the upper bottom support mechanism, and the lower bottom support mechanism after being folded is less than or equal to a height of the standing post; and a height of the handle mechanism after being retracted is less than or equal to the height of the standing post.

* * * * *